3,544,582
PROCESS FOR PREPARING AMINOISOXAZOLES
Harry Allen Albrecht, Nutley, and John Thomas Plati, Rutherford, N.J., assignors to Hoffmann-La Roche Inc., Nutley, N.J., a corporation of New Jersey
No Drawing. Filed Apr. 6, 1965, Ser. No. 446,103
Int. Cl. C07d 85/22
U.S. Cl. 260—307     7 Claims

ABSTRACT OF THE DISCLOSURE 3-amino-4-(H or alkyl)-5-alkyl isoxazoles are prepared by (a) reacting the corresponding 4-(H or alkyl)-5-alkyl isoxazole with isobutylene or a compound of the formula

wherein $R_3$, $R_4$ and $R_5$ are lower alkyl and X is I, Cl, Br, OH, $ClO_4$, lower alkosulfate, or the anion of a mineral acid, (b) reacting the product formed with hydroxylamine, and (c) treating that reaction product with a mineral acid. The 3-amino-4-(H or alkyl)-5-alkyl isoxazoles are useful intermediates for the preparation of known antibacterial sulfonamides.

---

The present invention relates to a process for the preparation of sulfonamides and more particularly relates to a process for the preparation of sulfonamides of the formula

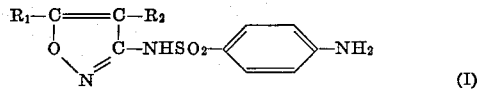

wherein $R_1$ is lower alkyl and $R_2$ is hydrogen or lower alkyl.

The process of the invention is carried out in accordance with the following reaction scheme:

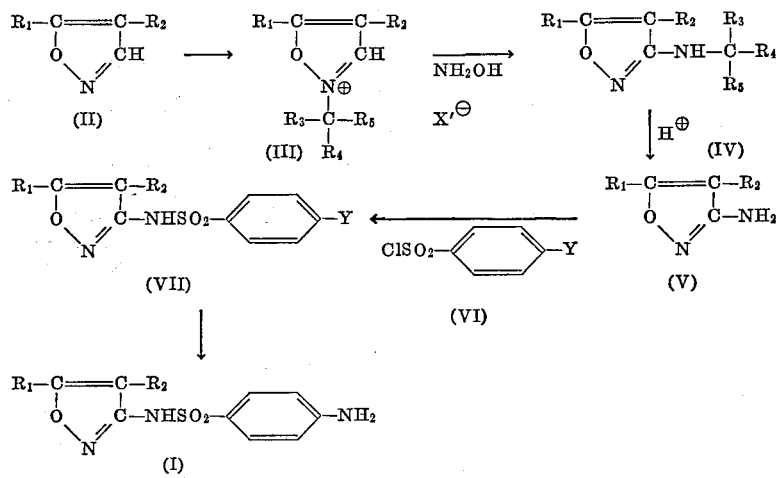

In the above reaction scheme $R_1$ is lower alkyl, $R_2$ is hydrogen or lower alkyl, $R_3$, $R_4$, and $R_5$ are lower alkyl, preferably methyl, and Y is an amino group precursor, e.g., a group which can be converted to an amino group through reduction or hydrolysis, for example, nitro, nitroso, azo, hydrazo, hydrazido, carbalkoxyamino, carbobenzyloxyamino group, etc., or prefarbly an acylamido group, for example, an alkanoylamido, preferably a lower alkanoylamido, e.g., acetamido, propionylamido, etc., or benzamido, or substituted benzamido, e.g., alkyl or halo-substituted benzamido. Compounds wherein $R_1$ is methyl and $R_2$ is hydrogen or methyl are preferred for use in the process of the invention.

The above sequence is carried out by reacting a substituted isoxazole of Formula II with either a compound having the formula

wherein X is I, Cl, Br, OH, $ClO_4$, or a lower alkosulfate or with isobutylene in the presence of a mineral acid, e.g., sulfuric, phosphoric, etc., or an arylsulfonic acid, e.g., benzenesulfonic acid, p-toluenesulfonic acid, etc., to form a compound or Formula III. When X is I, the reaction can be carried out without the presence of a mineral or arylsulfonic acid. $X_2$ in Formula III is either X when a compound of the formula

is employed or when isobutylene is employed represents the anion of the mineral acid used therewith. The compound of Formula III is then reacted with hydroxylamine in the presence of a base, e.g., an alkali metal hydroxide such as sodium hydroxide, potassium hydroxide, etc., an alkali metal carbonate or bicarbonate such as sodium bicarbonate, or an aliphatic tertiary amine such as a triloweralkylamine, e.g., triethylamine, trimethylamine, etc., to form a compound of Formula IV. The compound of Formula IV is then treated with a mineral acid, e.g., hydrochloric, hydrobromic, hydriodic, sulfuric, etc., with hydrochloric acid preferred, to form a 3-aminoisoxazole of Formula V. The 3-aminoisoxazole of Fomula V is then converted to the sulfonamide of Formula I according to known procedures, i.e., reacting a compound of Formula IV with a substituted benzenesulfonyl chloride of Formula VI to form a compound of Formula VII. The Y group in the compound of Formula VII is then converted to an amino group by known procedures, i.e., hydrolysis or hydrogenation depending on the nature of the Y group.

Compounds of Formula I are useful in the treatment of bacterial infections such as those caused by E. coli, Pneumococci, Streptococci, Staphylococci, etc.

The term "lower alkyl" used herein is to be understood to mean a straight or branched chain alkyl group having from 1 to 7 carbon atoms, such as methyl, ethyl, isopropyl, hexyl, heptyl, etc.; with methyl preferred in all cases.

The invention will be better understood from a consideration of the following examples which are given for illustration purposes only and are not meant to limit the invention.

EXAMPLE 1

Preparation of 3-amino-5-methylisoxazole

A mixture of 0.85 g. of predominantly 5-methylisoxazole and 1.85 g. of tert. butyl iodide was placed in a test tube and heated in an oil bath at 90–95° during about 40 minutes. During this interval it was noted that the inside temperature rose a few degrees above the bath temperature. On cooling, the mixture solidified for the most part, and it was digested with 5 ml. of dry ether, dried in vacuo, digested with 5 ml. of ethyl acetate, and finally washed with the latter solvent. In this manner 2.03 g. of the quaternary iodide, melting point 105–108°, was obtained. The product was crystallized from ethanol/ethyl acetate, melting point 107–110°.

A mixture of 20.6 g. of 2-tert. butyl-5-methylisoxazolium iodide, 5.4 g. of hydroxylamine hydrochloride and 70 ml. of water was stirred and cooled in an ice bath, and approximately 23 g. of 25 percent (w./w.) aqueous sodium hydroxide was added during 40 minutes at 5–6°, when a pH of about 7 was attained. On continued stirring and cooling, during about one hour, a thick precipitate was obtained. The ice bath was removed and the temperature allowed to rise to 20.5° during 50 minutes. The mixture was then stirred on the steam bath for 20 minutes during which a temperature of 85–89° was obtained for the most part. On cooling, filtration, and drying 8.48 g. of brownish 3-tert. butylamino-5-methylisoxazole, melting point 100–102.5°, was obtained. Crystallization from 20 cc. of 50 percent (v./v.) ethanol/water gave 7.98 g. of crystals, melting at 102–103°.

A mixture of 20.0 g. of 3-tert. butylamino-5-methylisoxazole and 160 ml. of 6 N hydrochloric acid was placed in a 500 ml. flask, which was provided with a condenser and a trap adapted for the return of aqueous layer and continuous removal of tert. butyl chloride. The flask was then heated in an oil bath, which was brought to a temperature of 135° in 18 minutes. At this temperature distillation of tert. butyl chloride had begun. Heating was continued, while the temperature of the oil bath was gradually raised to 150° during 30 minutes, and 9.5 ml. of tert. $C_4H_9Cl$ was collected. The reaction was immediately quenched by cooling the mixture below 10° in an ice bath. The mixture was then neutralized with stirring by cautious, portionwise addition of 77.4 g. of sodium bicarbonate during 32 minutes. No further cooling was necessary, when this step was carried out immediately. The mixture was allowed to warm to 21° with stirring and then extracted three times with 60 ml. of ethyl acetate. After drying with sodium sulfate the solvent was removed at reduced pressure in an evaporator with gentle heating below 37° by means of a water bath. Further pumping in a vacuum dessicator (provided with KOH) gave 10.98 g. of residue, melting at 59–61° with some sintering at 57°. This material was dissolved in 22 ml. of hot benzene and allowed to crystallize for 1 hour at room temperature and 3 hours in the refrigerator. In this manner 10.38 g. of recrystallized 3-amino-5-methylisoxazole was obtained; melting point 61–62.5° with sintering at 59°.

EXAMPLE 2

Preparation of $N^1$-(5-methyl-3-isoxazolyl)sulfanilamide

A solution of 3.60 g. of 3-amino-5-methylisoxazole, 8.0 g. of N-acetylsulfanilyl chloride and 20 ml. of dry pyridine was allowed to stand for 1 hour during which the temperature rose to 57°. Addition of 40 ml. of water gave a crystalline precipitate which was filtered after 1 hour, washed with water, and dried first in a vacuum desiccator over KOH and then in an oven at 60°. The acetylsulfanilamide weighed 8.40 g. and melted at 220–222.5° d. An additional 0.56 g., melting point 223–225° d., was obtained from the filtrate. Total yield =8.96 g. of $N^4$-acetyl-$N^1$-(5-methyl-3-isoxazolyl)sulfanilamide.

A mixture of 5.0 g. of the acetylsulfanilamide and 25 ml. of 10 percent aqueous sodium hydroxide was stirred and heated on the steam bath for 1 hour at 94–97°. After cooling to room temperature, 4.5 ml. of acetic acid was added to precipitate the free sulfa drug. The mixture was cooled in an ice bath for 30 minutes and filtered. After washing with water and drying, the product, $N^1$-(5-methyl-3-isoxazolyl)sulfanilamide, weighed 4.16 g. and melted at 166–169°.

EXAMPLE 3

A suspension of 50.4 g. of 2-tert. butyl-5-methylisoxazolium perchlorate, 14.7 g. of hydroxylamine hydrochloride, and 210 ml. of water was cooled in an ice bath and stirred vigorously, and 66.3 g. of 25 percent (w./w.) aqueous sodium hydroxide was added at 4–5° during 1.25 hours. The pH of the resulting final solution at this time was noted to be about 7. The ice bath was removed, and the temperature allowed to rise to 13° during 20 minutes when 1 ml. of acetic acid was added. The mixture was stirred for 1.1 hours, during which the temperature rose to 22.5° and a thick white precipitate was formed, and finally the mixture was heated on the steam bath and stirred at 80–90° for 20 minutes. On cooling in an ice bath brownish crystals of 3-tert. butylamino-5-methylisoxazole were obtained. After filtering, washing with water, and drying in vacuo over potassium hydroxide they weighed 27.6 g. and melted at 98–100°. The brown color can be largely removed by stirring vigorously with 5 volumes of water and 1 part of sodium bisulfite for 1.5 hours. For crystallization the 3-tert. butylamino-5-methylisoxazole was dissolved in 33 ml. of hot ethanol, and the solution was diluted with 33 ml. of hot water; melting point 102–103°; weight 24.6 g.

A solution of 10.0 g. of the 3-tert. butylamino-5-methylisoxazole and 80 ml. or a solution of concentrated hydrochloric acid-water (1:1) was brought to boiling and distilled slowly during 50 minutes, in such a manner so as to remove low boiling material, presumably tert. butyl chloride, as soon as it was formed during the hydrolytic process. Approximately, 4.5 ml. of tert. butyl chloride was collected, but some of it may have been lost due to its volatility. The mixture was cooled and immediately distilled to dryness in vacuo in a rotary evaporator (Swissco). The residue was dissolved in 10 ml. of water and cooled in an ice bath. The solution was made alkaline to a pH of about 10 with about 4.5 ml. of 50 percent (w./w.) aqueous sodium hydroxide, and finally extracted 5 times with 40 ml. of ether. After drying with sodium sulfate the combined ether extracts were evaporated to dryness in vacuo, and the residue was dried further in a vacuum desiccator over potassium hydroxide. The material was dissolved in 10 ml. of dry ether and allowed to crystallize first at room temperature during 1.5 hours and then in an ice bath for 0.5 hour. The crystals of 3-amino-5-methylisoxazole thus obtained weighed 4.87 g. and melted at 61–62.5°.

EXAMPLE 4

To 5 ml. of concentrated sulfuric acid cooled by an ice bath was added with stirring 0.50 g. of 3-tert. butylamino-5-methylisoxazole. The ice bath was removed and the mixture allowed to warm to 25°. After standing for 10 minutes at this temperature, the turbid mixture was poured into a beaker containing 5 g. of ice with further cooling by means of an ice bath. With continued cooling 5 cc. of water was added and then dropwise 9.6 ml. of .50 percent (w./w.) aqueous sodium hydroxide. A thick crystalline cake of sodium sulfate and a brown oily layer appeared within a short time. The mixture was extracted 6 times with 10 ml. of ether, decanting each time. The combined ether extracts were dried over sodium sulfate and evaporated to dryness, whereupon 0.42 g. of a semicrystalline residue of crude 3-amino-5-methylisoxazole was obtained.

EXAMPLE 5

Preparation of 3-amino-4,5-dimethylisoxazole (A) Preparation of 2-tert. butyl-4,5-dimethylisoxazolium iodide.—(1) 4,5-dimethylisoxazole (97 g.) in a 1-liter flask was stirred and heated to 100° by means of an oil bath as 115°. Tert. butyl iodide (92 g.) was added dropwise over a 30 minute period at 100–109°. When the addition was two-thirds complete, crystallization began. Heating was continued for 20 minutes after completion of the addition, to maintain the reaction temperature at 100–109°. The reaction mixture was allowed to cool and then stirred vigorously with ether (400 ml.) to obtain pale yellow crystals, which were filtered, washed with ether, and dried on a steam bath; yield 134.5 g. 2-tert. butyl-4,5-dimethylisoxazolium iodide, melting point 152–152.5° after sintering at 145°.

The ether filtrate as distilled on a small column, first at atmospheric pressure to remove the ether and then at reduced pressure to recover 4,5-dimethylisoxazole; 37.6 g., boiling point 85–86° at 90 mm.

(2) A mixture of 4,5-dimethylisoxazole (20 g.), tert. butyl iodide (38 g.), and heptane (100 ml.) was stirred and heated on the steam bath for 22 hours. After cooling, the heptane was decanted, and the residue stirred vigorously with ether (100 ml.) before filtering. The crude product was washed in the filter with three 20 ml. portion of ether (42.2 g., melting point 137–140°). Recrystallization from ethanol (85 ml.) and ether (500 ml.) gave pale yellow crystals which were dried over steam; yield 38.6 g., melting point 150–151°.

(B) Preparation of 3-tert. butylamino-4,5-dimethylisoxazole.—2-tert. butyl-4,5-dimethylisoxazolium iodide (116 g.) and hydroxylamine hydrochloride (29.0 g.) were dissolved in water (580 ml.). With cooling in ice, 50 percent aqueous sodium hydroxide (66.1 g.) was added over a period of 30 minutes, at 5°. Cooling in ice was continued for one hour; then the ice bath was removed and the reaction stirred for one hour while warming to room temperature The reaction was heated on the steam bath to 85° (10 minutes) and maintained above 85° for 20 minutes. The mixture was chilled in ice for 30 minutes and filtered. The product, 3-tert. butylamino-4,5-dimethylisoxazole, was washed with three 75 ml. portions of cold water; yield 54 g., melting point 128–130°.

This product contained a small proportion (5–10 percent) of 5-tert. butylamino-3,4-dimethylisoxazole which could be distinguished by N.M.R. and T.L.C. [fluorescent silica with ethyl acetate-benzene (1:3)]. A sample crystallized from dilute ethanol for analysis melted at 131–133°.

(C) Preparation of 3 - amino-4,5-dimethylisoxazole.— The removal of the tert. butyl group occurred with concentrated hydrochloric acid at room temperature, with concentrated sulfuric acid at lower temperatures, and finally with dilute hydrochloric acid. In general most of the dealkylation occurred after 5–10 minutes of refluxing, but at this point a small amount of 5-amino-3,4-dimethylisoxazole could be discovered by T.L.C. (fluorescent silica and ethyl acetate). Most of this 5-amino compound was destroyed by refluxing for 30 minutes. Only a barely discernible trace was indicated by T.L.C. To assure complete destruction the refluxing time was increased to 1 hour according to the preferred procedure below.

3-tert. butylamino - 4,5 - dimethylisoxazole (40 g.) was refluxed with 6 N hydrochloric acid (200 ml.) for one hour under a trap to remove tert. butyl chloride as it was formed. The oil bath was maintained at 150°; the tert. butyl chloride (17 g.) was nearly all collected in the first 15 minutes.

The hydrochloric acid was distilled off in vacuo at a bath temperature of 75° within 30 minutes, and the residue was dissolved in water (40 ml.) and filtered. With stirring and cooling below 30°, 50 percent (w./w.) aqueous sodium hydroxide (25 ml.) was added dropwise until precipitation of the product was complete, and the mixture was strongly basic. After chilling, the product, 3-amino-4,5-dimethylisoxazole, was filtered and washed with two 10 ml. portions of cold water; yield 19.6 g., melting point 114–116°. On recrystallization from 60 ml. of water and decolorization with charcoal the melting point was unchanged; yield 17.1 g.

EXAMPLE 6

Preparation of $N^1$-(4,5-dimethyl-3-isoxazolyl) sulfanilamide

To a solution of 3-amino-4,5-dimethylisoxazole (4.00 g.) in 20 ml. of dry pyridine, p-acetylaminobenzenesulfonyl chloride (8.34 g.) was added and swirled into solution. The reaction temperature rose spontaneously to 40°, and was maintained there by warming for 30 minutes. After standing at room temperature for an additional 30 minutes, the mixture was diluted with water (110 ml.). The product was allowed to crystallize for 2 hours before filtering and washing liberally with water; yield, 9.05 g. of crude $N_1$-(4,5 - dimethyl - 3 - isoxazolyl)-$N^4$-acetylsulfanilamide, melting point 220–223°. This product should melt at 227–230° and was probably contaminated by a small amount of bis-substituted product.

When a sample (0.50 g.) was thoroughly triturated with 10 percent aqueous sodium hydroxide, it did not dissolve completely. After filtering, 25 percent acetic acid (3.5 ml.) was added to precipitate the product; 0.40 g., melting point 227–230°.

The $N^4$-acetyl derivative (8.00 g.) was stirred with 10 percent w./v. aqueous sodium hydroxide (80 ml.) and heated on the steam bath for one hour. The hot solution was poured into 160 ml. of water at the boiling point, and acetic acid (19.5 ml.) was quickly added. Large needles of $N^1$-(4,5 - dimethyl - 3 - isoxazolyl)sulfanilamide crystallized rapidly. After three hours the product was filtered and washed with water: Yield 6.05 g., melting point 193.5–195°.

EXAMPLE 7

Alternate procedure for the preparation of 3-tert. butylamino-5-methylisoxazole (A) To 52.6 g. of 95 percent sulfuric acid in a 200 ml. three-necked flask provided with stirrer, dropping funnel and thermometer and cooled by means of an ice-salt bath, 24.9 g. of 5-methylisoxazole was added with stirring so that the temperature was maintained at 5–10° during about 20 minutes. With continued cooling and stirring 22.2 g. of tert. butanol was then added at 8–10° during about 15 minutes, while the dropping funnel was very gently heated by means of a heating tape to prevent solidification of the tert. butanol. The mixture was stirred for an additional 10 minutes at 8–10°, which was maintained by partial lowering of the freezing bath. Finally, the bath was removed, and the mixture allowed to warm spontaneously, when the temperature rose to a maximum of 41° after 18 minutes. After an additional 7 minutes the temperature fell to 37°, and the mixture was stirred and heated in an oil bath at 95–100°, which maintained an inside temperature of 85–90° during 2 hours. The mixture was then cooled below 50° and added with stirring to a 2 liter flask containing 21.0 g. of hydroxylamine hydrochloride, 450 ml. of cold (5°) water, and 180 g. of crushed ice. At this stage no ice remained and a temperature of −2° was obtained. To this acid solution 111 g. of sodium bicarbonate was added in portions during 30 minutes (effervescence). No external cooling was necessary, the temperature being maintained below 6°. The pH of the solution at this point was approximately 7. The mixture was then heated to 65° during 12 minutes by means of an oil bath, maintained at about 85°. Subsequently, an inside temperature of 65–70° was maintained during 20 minutes, after which 9.0 g. of acetic acid was added all at once, and stirring and heating at 70° (inside) was continued for 20 minutes. Some crystals of the 3-tert. butylamino compound appeared before the acetic acid addition, but the major amount appeared afterwards. The mixture was finally cooled and filtered, and the crystals were washed three times with 50 ml. of cold water and dried in a vacuum desiccator over potassium hydroxide. The yield of crude 3-tert. butylamino-5-methylisoxazole, melting point 100–101°, amounted to 36.0 g. For recrystallization 31.0 g. of crude material was dissolved in 39 ml. of hot ethanol and treated with 37 ml. of hot water. In this manner 29.1 g., melting point 101–102°, was obtained.

(B) To 34.6 g. of 95 percent sulfuric acid in a flask provided with stirrer, dropping funnel, and thermometer and cooled by means of an ice-salt bath, 16.6 g. of 5-methylisoxazole was added with stirring at 0 to −2° during 37 minutes. With continued cooling and stirring 18.5 g. of tert. butyl chloride was added during 8 minutes to 0 to −4°. The freezing bath was removed, and the temperature allowed to rise to 23° during about 20 minutes, after which the flask was provided with a reflux condenser and heated by means of an oil bath, at 67–69°. The inside temperature remainded at about 53° due to the refluxing tert. butyl chloride, which persisted as an insoluble phase until consumed in the reaction. Hydrogen chloride was liberated during this process. Heating was continued for a total of about 6.3 hours, when the inside temperature rose to 66°. The bath was removed, and mixture was allowed to stand during 14 hours and then reheated by means of an oil bath with stirring during about 2 hours at 85–88° (inside). The mixture was then cooled to room temperature and poured into a flask containing 14.0 g. hydroxylamine hydrochloride, 160 ml. of water, and 120 g. of ice, and the resulting acid solution was treated portionwise with 74 g. of sodium bicarbonate with cooling by means of an ice bath, so that the inside temperature did not exceed 10°. About 20 minutes was required (effervescence). The mixture was then warmed by means of a water bath, usually maintained at 75°, so that the inside temperature was regulated at about 60–70° for 15 minutes. At this point 6 ml. of acetic acid was added, and heating was continued at 70° (inside) for an additional 15 minutes. Crystals of 3-tert. butylamino-5-methylisoxazole appeared during both phases of the heating process, but became more copious after addition of acetic acid. After cooling to 20° the mixture was filtered, and the crystals were washed with water and dried in a vacuum desiccator over potassium hydroxide. In this manner 20.8 g. of 3-tert. butylamino-5-methylisoxazole, melting point 101–102°, was obtained. For recrystallization the material was dissolved in 25 ml. hot ethanol and treated with 25 ml. of hot water; yield 19.8 g., melting point 101–103°.

EXAMPLE 8

5-methylisoxazole (16.6 g.) was added dropwise with stirring to 95 percent sulfuric acid (35.0 g.) over a period of 15 minutes while cooling in an ice-salt bath to maintain the reaction at 5–10°. The cold bath was removed, and isobutylene was passed in. The reaction temperature rose to 30–35°, where it was maintained by occasional gentle warming. After 50 minutes, the initial rapid increase in weight had ceased (weight gained 7.05 g.). The flow of isobutylene was then interrupted, and the reaction heated on an oil bath maintained at about 95° for 2 hours (reaction temperature 85–90°).

The reaction was cooled to 30°, and isobutylene again passed in for 35 minutes at 30–35°, for 10 minutes while warming the reaction to 50°, and for 2 hours afterwards at 50°. During this time, isobutylene was gradually taken up until a total of 10.22 g. had been gained.

The reaction was allowed to stand at room temperature overnight, then poured into a mixture of cold water (300 ml.), hydroxylamine hydrochloride (14.0 g.) and ice (120 g.). The reaction temperature fell to −5°. Sodium bicarbonate (74 g.) was added cautiously in portions over a period of 30 minutes, neutralizing the reaction to about pH 7. No external coolingw as required when the neutralization was performed immediately, the reaction temperature rising only to 8°.

The mixture was heated in an oil bath maintained at about 80° for 15 minutes while the inside temperature rose to 65° and then the inside temperature was maintained at 65–70° for 20 minutes. Acetic acid (6.00 g.) was added all at once, and heating at 70° continued for 20 minutes. The mixture was cooled to 20°, filtered, and the product washed with three 30 ml. portions of cold water; crude yield of 3-tert. butylamino-5-methylisoxazole, 23.3 g., melting point 97–99°.

The crude product was dissolved in hot ethanol (35 ml.) and crystallized by the addition of hot water (35 ml.). When about half the volume of water had been added, the hot solution was filtered to remove a little insoluble material. Then, the remainder of the water was added, and the product allowed to crystallize, first at room temperature, then in an ice bath; yield 19.5 g., melting point 100–101°.

What is claimed is:
1. A process for the preparation of a compound of the formula

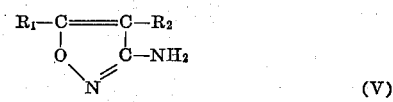

(V)

comprising the steps of (a) reacting a compound of the formula

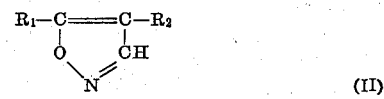

(II)

with a compound selected from the group consisting of isobutylene and a compound of the formula

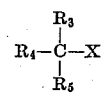

wherein $R_3$, $R_4$ and $R_5$ are lower alkyl, and X is selected from the group consisting of I, Cl, Br, OH, $ClO_4$, and a lower alkosulfate in the presence of a mineral acid to form a compound of the formula

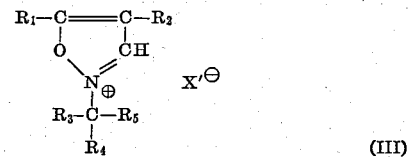

(III)

wherein X′ is the anion of said mineral acid,
(b) reacting the compound of Formula III with hydroxylamine in the presence of a base to form a compound of the formula

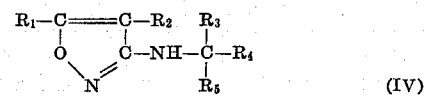

(IV)

(c) reacting the compound of Formula IV with a mineral acid to form a compound of Formula V, wherein in the above compounds $R_1$ is lower alkyl and $R_2$ is selected from the group consisting of hydrogen and lower alkyl.

2. A process according to claim 1 wherein the compound of Formula II is reacted with tertiary butyl chloride and the compound of Formula IV is treated with hydrochloric acid.

3. A process according to claim 1 wherein $R_1$, $R_3$, $R_4$ and $R_5$ are methyl and $R_2$ is hydrogen.

4. A process for the preparation of a compound of the formula

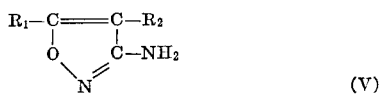
(V)

comprising the steps of (a) reacting a compound of the formula

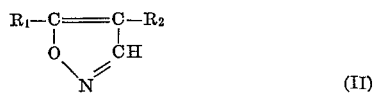
(II)

with a compound selected from the group consisting of isobutylene and a compound of the formula

wherein $R_3$, $R_4$ and $R_5$ are lower alkyl to form a compound of the formula

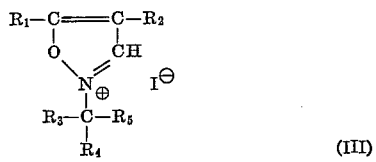
(III)

(b) reacting the compound of Formula III with hydroxylamine in the presence of a base to form a compound of the formula

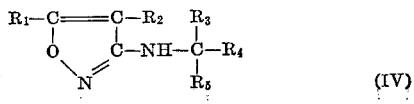
(IV)

(c) reacting the compound of Formula IV with a mineral acid to form a compound of Formula V, wherein in the above compounds $R_1$ is lower alkyl and $R_2$ is selected from the group consisting of hydrogen and lower alkyl.

5. A process according to claim 1 wherein the mineral acid of step (a) is sulfuric acid and step (c) is hydrochloric acid.

6. A process for the preparation of a compound of the formula

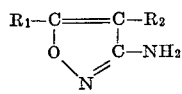

wherein $R_1$ is lower alkyl and $R_2$ is selected from the group consisting of hydrogen and lower alkyl, comprising reacting a compound of the formula

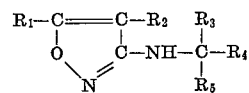

wherein $R_1$ and $R_2$ are as previously described and $R_3$, $R_4$ and $R_5$ are lower alkyl, with a mineral acid.

7. A process according to claim 6 wherein the mineral acid is sulfuric acid.

References Cited

UNITED STATES PATENTS 3,157,669    11/1964    Plati et al.   ---------- 260—307

OTHER REFERENCES

Ainsworth et al., J. Org. Chem., vol. 27, pp. 4118–4120 (1962).

Kardindex Sheets No. 4, Aldrich Chemical Co., April 1964, entry aB9695.

ALTON D. ROLLINS, Primary Examiner